April 18, 1961 P. L. DATT ET AL 2,980,849
SENSING HEAD FOR WELD SEAM TESTING APPARATUS
Filed Dec. 24, 1956 3 Sheets-Sheet 1

INVENTORS
P. L. DATT
W. J. WARREN
R. B. WILLOUGHBY
BY J. H. McCarthy
THEIR AGENT April 18, 1961   P. L. DATT ET AL   2,980,849
SENSING HEAD FOR WELD SEAM TESTING APPARATUS
Filed Dec. 24, 1956   3 Sheets-Sheet 2

INVENTORS
P. L. DATT
W. J. WARREN
R. B. WILLOUGHBY
BY  J. H. McCarthy
THEIR AGENT April 18, 1961 P. L. DATT ET AL 2,980,849
SENSING HEAD FOR WELD SEAM TESTING APPARATUS
Filed Dec. 24, 1956 3 Sheets-Sheet 3
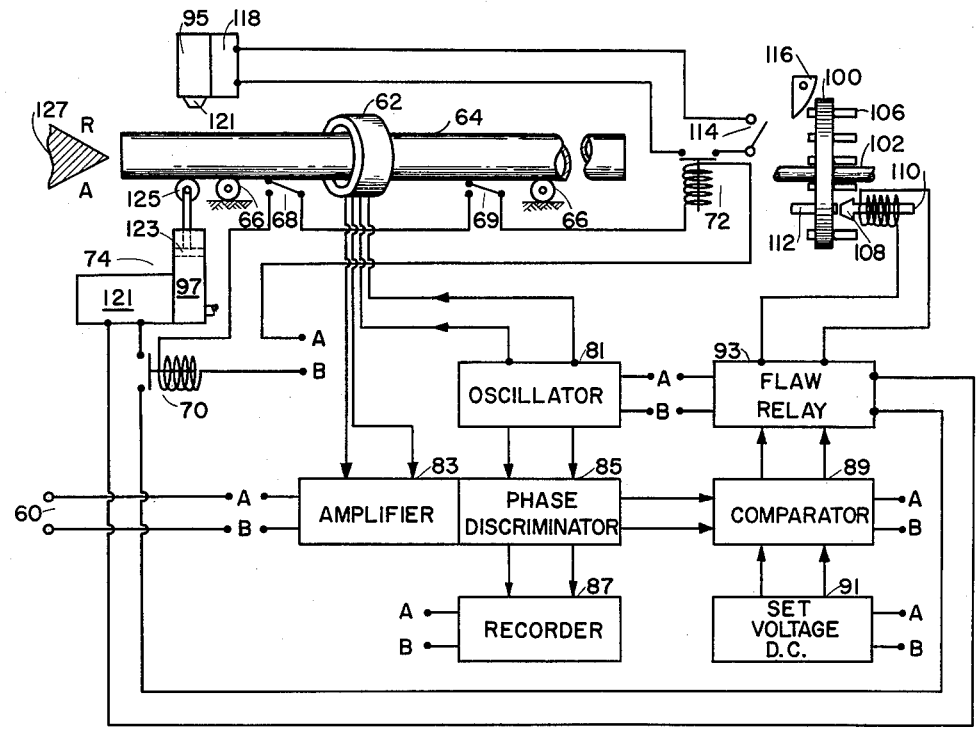
FIG. 6
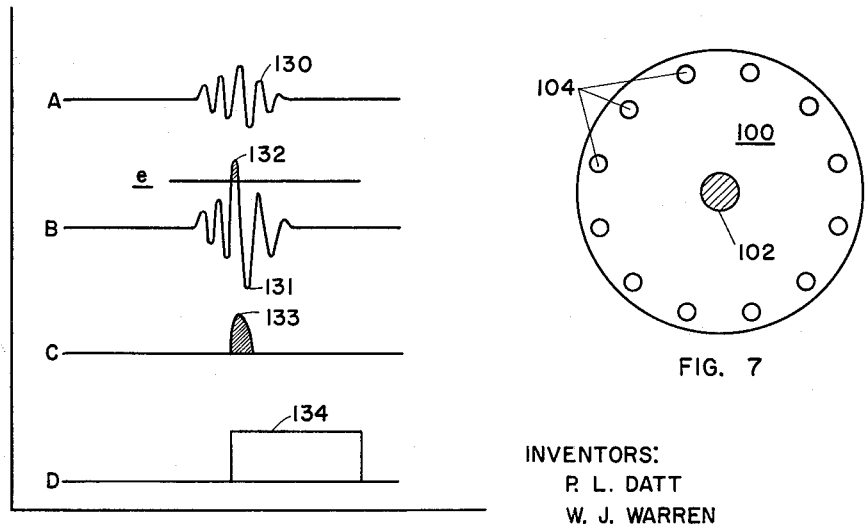
FIG. 8
FIG. 7
INVENTORS:
P. L. DATT
W. J. WARREN
R. B. WILLOUGHBY
BY: J. H. McCarthy
THEIR AGENT United States Patent Office 2,980,849
Patented Apr. 18, 1961

2,980,849

SENSING HEAD FOR WELD SEAM TESTING APPARATUS

Paul L. Datt, Walnut Creek, William J. Warren, El Cerrito, and Richard B. Willoughby, Walnut Creek, Calif., assignors to Shell Oil Company, a corporation of Delaware Filed Dec. 24, 1956, Ser. No. 630,281

4 Claims. (Cl. 324—37)

This invention relates to an apparatus for magnetically detecting and recording flaws and variations in the wall thickness of metallic members, particularly elongated metallic tubular elements, such for example as lengths of heat exchanger tubing.

In addition to testing extruded tubing, the present apparatus pertains particularly to the non-destructive testing of the longitudinal seam of welded tubing made of non-magnetic materials.

At present there are at least three methods of testing the seam of welded tubing as it is being manufactured, and each of the various test methods has one or more drawbacks. The visual test method is often uncertain and cannot be employed to detect flaws beneath the surface of the tubing. The hydrostatic test method is both inconvenient and time-consuming in that the tubing must be cut into short sections, say twenty feet, in order that one end may be closed while hydrostatic pressure is applied at the other end. Probably the most convenient test method employed to date is the X-ray test method but this, unfortunately, is very expensive.

It is therefore an object of the present invention to provide a magnetic testing system adapted for non-destructive testing of the longitudinal seam of welded tubing of non-magnetic materials.

A further object of this invention is to provide a magnetic testing system capable of furnishing a complete and accurate record of the relative thickness of a member under test throughout its length in such a manner that any thickness variation due to structural characteristics of said member, or due to a weld in said member, will appear on the record as definite reference points for a ready determination of the location of said undersirable variations or flaws.

Another object of this invention is to provide a sensing head for a magnetic testing system through which continuous lengths of extruded or welded tubing may pass and by which flaws in said tubing or said weld therein may be located.

Still another object of this invention is to provide a magnetic testing system by which continuous lengths of tubing may be tested, said system being provided with means for positively marking the portions of tubing having flaws therein.

A further object of this invention is to provide a magnetic testing system adapted to locate flaws in welded tubing of non-magnetic material, said system being adapted to reject sections of tubing having flaws therein.

These and other objects of this invention will be understood from the following description taken with reference to the attached drawing wherein:

Figure 6 is a diagrammatic view of the general arrangement of parts and electrical circuits of the present testing system, showing a sensing-head having passing therethrough a tubular member such as may be tested according to the present invention.

Figur 7 is an end view of disc 100 shown in Figure 6.

Figure 8 illustrates four curves which diagrammatically represent various types of signals originating in or exchanged between the different units or circuits of the present system.

Figure 1:
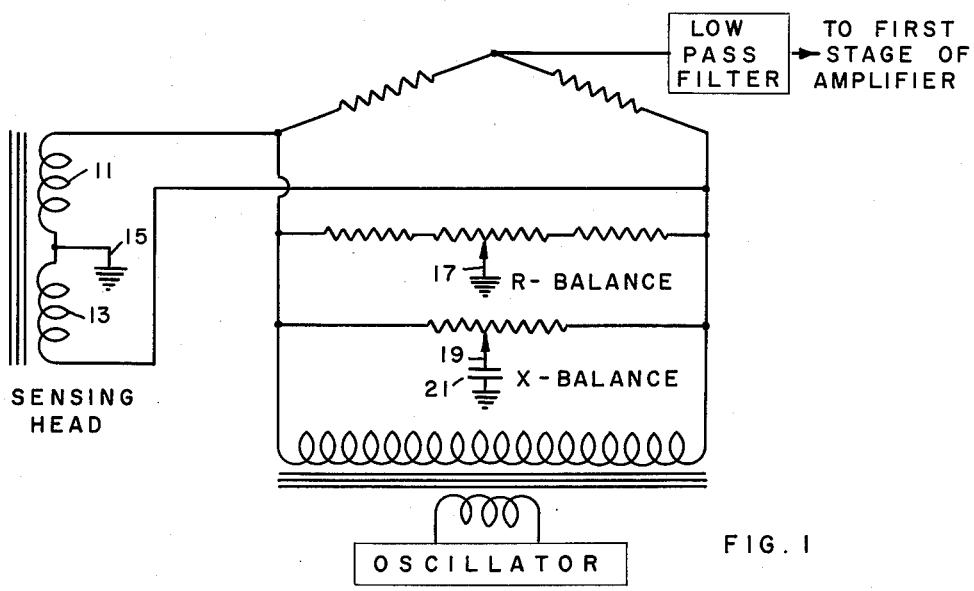
Figures 1 and 2 are schematic views of the general arrangement of parts and electrical circuits of two modifications of the present magnetic testing system.
Figure 2:
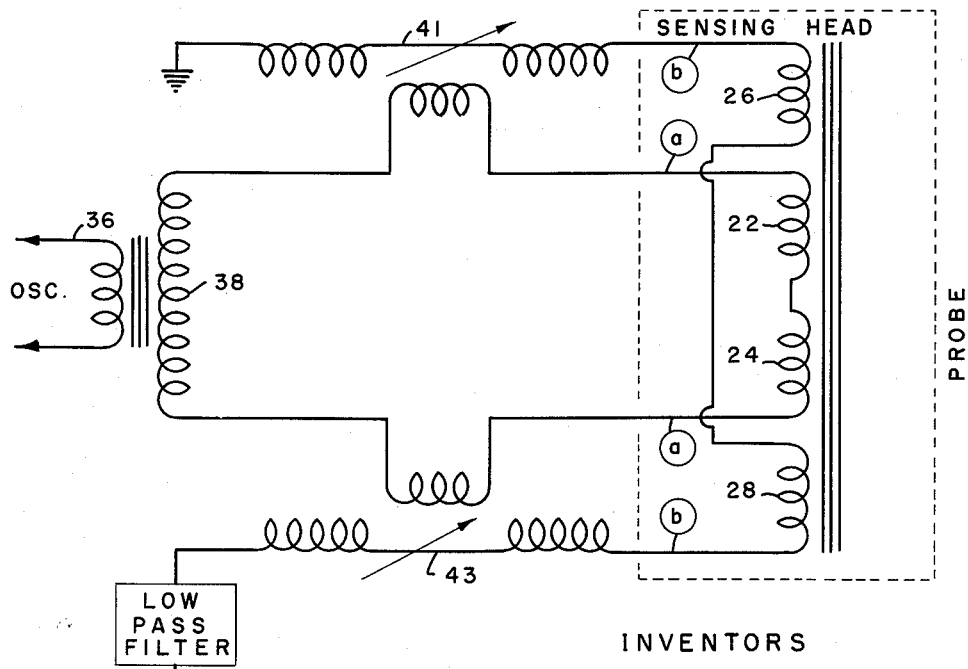

Wiring connections of sensing heads suitable for use with the system are shown in Figures 1 and 2. The head shown in Figure 1 has only two coils 11 and 13, both primaries, having a ground 15 therebetween. Means for adjusting resistance are shown at 17, and means for adjusting inductive reactance are shown at 19, the latter comprising a capacitor 21 to ground.

Figures 3, 4:
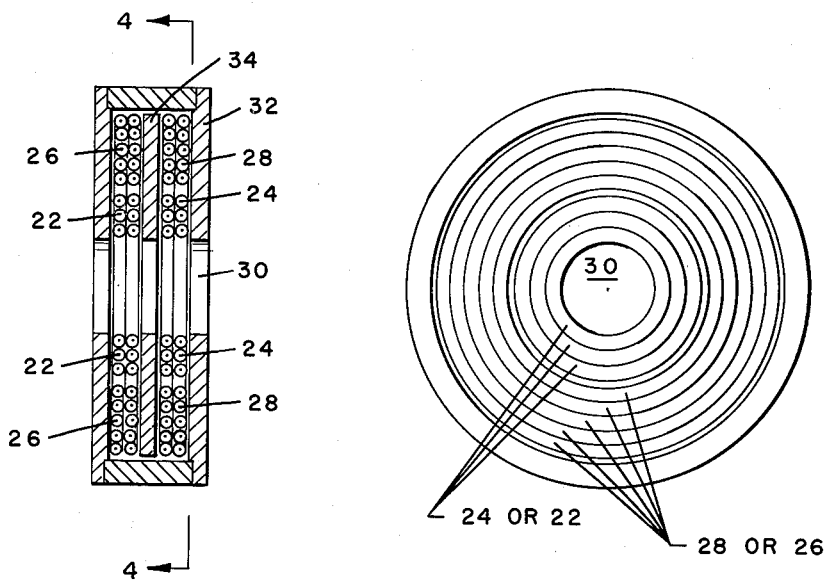
Figure 3 is a diagrammatic view taken in cross-section of the annular-shaped sensing head of the present test system.
Figure 4 is a view taken along line 4—4 of Figure 3.

The head shown in Figure 2 has two primaries 22 and 24, physically positioned between, or surrounded by, the secondaries 26 and 28. The actual construction of the sensing head of Figure 2 is shown in greater detail in Figures 3 and 4, showing two views, at right angles to each other, of a cross-section of said head.

The head has the general shape of a flat annulus, being provided with a central axial opening 30, through which any elongated element such as a tubular member under test is passed. The head has a cover 32, and a central partition 34, made of a material such as "Mu Metal" which is a steel alloy having high electrical permeability, which is made by Allegheny-Ludlum Corp., separating coils 22 and 26 from coils 24 and 28. The primaries 22 and 24 are energized from an oscillator by means of a transformer having primary and secondary windings 36 and 38 (Figure 2) in series with coils 22 and 24.

Figure 5:
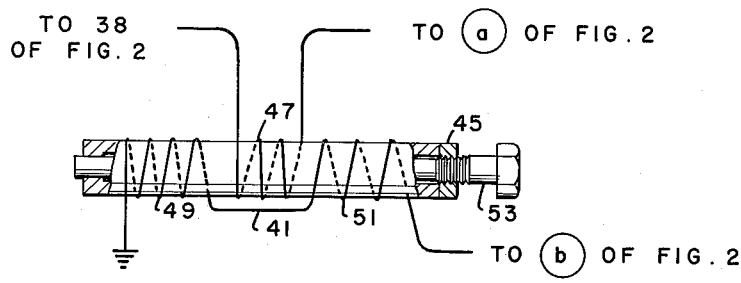
Figure 5 is a diagrammatic view of one coil-balancing means adapted to be used with the present system.

Magnetic coupling between coils 22 and 26 (or 24 and 28), is balanced out by means of the balancing coils 41 and 43 of Figure 2, as shown in greater detail in Figure 5.

The balancing coil 41, shown in Figure 5, comprises a non-magnetic tubular form or element 45 on which there is wound a primary 47 electrically connected as shown in the drawing. The secondary which is also wound on the core 45 comprises two coils 49 and 51, located to either side of the primary 47 and connected as shown. The magnetic coupling between the primary and secondary coils can be adjusted or varied by advancing or withdrawing an armature member 53, by any suitable means as by a micro-screw 53a.

The structure of the balancing coil 43 (Figure 2) may be identical with that of coil 41, except for the material of the armature 53. For example if one of the armatures for coils 41 and 43 is made of a magnetic material, and the other of a non-magnetic material such as brass, they can be effectively used to balance out resistance and inductive reactance effects, respectively, caused by the mutual inductance between the coils 22 and 26 (or 24 and 28).

Figure 6 shows the general arrangement of the units forming the present system. The system is energized from any desired source of electric power 60, to which each of the units of the system is connected by means of the several sets of terminals diagrammatically indicated at A and B, the complete circuits for providing operating currents not being shown to simplify the drawing. The sensing head 62, which is that of Figures 1–4, is positioned to receive within its central opening a tubular or other elongated metallic member 64, which is advanced therethrough by means of rollers 66 while being magnetically tested by the head 62. Positioned to either side of the head 62 are switches 68 and 69. These switches are biased to remain normally open, and are closed in succession by the test member 64 as it is advanced through the annular head 62. The switches 68 and 69 are connected in series across the power supply terminals A and B and form part of a branch circuit comprising relay switches 70 and 72. When the current in this branch circuit is interrupted due to the opening of either switch 68 or switch 69, or both, the relay switches 70 and 72 open likewise, thus deenergizing the sorting unit 74 and the marking unit 95 to be described hereinbelow. It will be seen that units 74 and 76 are thus rendered inoperative whenever there is no test member within the sensing head 62, or only one end of such member is inserted therein, that is, when one or both of the switches 68 and 69 are open. This is an important feature of the present system, because the ends of any test member constitute non-sysmmetric or irregular arrangements of metallic matter, and test members cannot be correctly marked or sorted in accordance with magnetic indications obtained at said ends.

An energizing alternating current of a frequency such as from 500 cycles to 25 kilocycles is supplied to the testing head 62 by an oscillator 81, and the signals from the testing head are received by an amplifier 83. A part of the amplifier circuit comprises a phase discriminator circuit 85, which is likewise fed by the oscillator 81. The discriminator circuit operates as a gate: if the signal pulse received from the head 62 is in phase with the current received from the oscillator 81, the signal pulse is allowed to pass to a recorder 87 and to a comparator unit 89. In the comparator unit 89, the signal pulse is compared as to amplitude with that of a predetermined or set D.C. voltage received from a source 91. If the signal pulse amplitude exceeds that of the present voltage, this excess voltage is applied as signal to a flaw relay circuit 93, where the signal is stretched with regard to its time of duration, so as to permit said signal to operate a relay (signals actually received from this head are normally of such short duration that they are not operative for energizing relays).

Upon energization of the flaw relay circuit 93, the latter actuates a marking unit 95 and the sorting or selecting unit 97 in the following manner.

A disc 100 is arranged for rotation about a shaft or axis 102 by any desired prime mover means, not shown. The disc 100 has near its circumference a plurality of holes 104, inserted in which are a plurality of pegs 106. The armature 108 of a relay solenoid 110 is positioned in register with the circle along which the pegs 106 are arranged. Upon energization of the solenoid, the armature 108 is propelled toward the disc 100, and depresses one of the pegs, for example, peg 112. Upon continued rotation of the disc 100, peg 112 moves past a switch 114 and monometarily closes this switch, thus energizing the control mechanism 118 of the marking unit 95 and causing said unit to project a marking substance, such as a drop of paint, on the test member 64. The speed of rotation of disc 100 is synchronized with the speed of motion of the test member 64 through the head 62 in such manner that the flaw which produces a signal adapted to energize the flaw relay unit 93 has exactly at the time to move adjacent the marking nozzle 121 at the time when the peg 112 arrives at switch 114 and closes this switch. The peg 112 is then returned to its original position by a cam 116 during the continued rotation of disc 100.

The energizaion of the flaw relay circuit 93 causes likewise an operating signal to be transmitted to the control circuit 121 of a selecting or sorting unit 74. The latter may comprise a cylinder 97 to which, upon the reception of a signal by the control circuit 121, a hydraulic fluid is admitted from any desired source, not shown, to move a piston 123 provided with a piston rod carrying a guiding wheel 125 serving to direct the test member either to the "Accept" or the "Reject" side of a sorting wedge 127. It is understood that the sorting system has been described hereinabove only by way of mere illustration, and can be replaced by any equivalent automatic sorting system desired without departing from the spirit of the present invention.

The operation of the present system can further be made clear from a consideration of the various types of signals originating in or exchanged between the different units or circuits of the system, as diagrammatically illustrated in Figure 8.

The sensing head 62 being adjusted to a state of balance at the beginning of a test, no current or signal is delivered to the amplifier until a portion of the pipe having a flaw is made to pass through the head, at which time the sensing head becomes magnetically unbalanced and produces a "defect" signal such as shown at 130 on line A of Figure 8. This defect signal consists of a group of oscillations having a frequency equal to that of the oscillator 81. This signal is amplified at 83 to an amplitude shown at 131 on line B, and, if the phase of the signal is the same as that of the oscillator, the signal is passed by the phase discriminator 85 to the comparator 89, where the signal is compared for amplitude with a predetermined set D.C. voltage supplied by the unit 91 and shown at $e$ on line B of Figure 8.

The desired defect signal from the sensing head is shifted in phase in the amplifier so that it will be in phase with the oscillator signal applied to the discriminator. This phase shift can be accomplished in other parts of the circuit. For example, the oscillator signal to either the sensing head or the discriminator could be shifted in phase.

The reason for using phase discrimination rather than amplitude detection is because defect signals can be detected in the presence of unwanted signals from such things as stress in the metal, or the "drag cup effect," provided they are separated in phase. Also, with phase discrimination it is possible to detect signals caused by a single type of defect from signals caused by all other types of defects. Each type of defect has a characteristic phase angle in any particular given metal.

If the amplitude of the signal 131, which is determined by the magnitude of the flaw to which it corresponds, exceeds a predetermined permissible value, that portion of the signal which is in excess of the preset voltage $e$, as shown at 132, operates to trigger a special circuit in the comparator, which amplifies said excess voltage to a value shown at 133 on line C, and stretches the signal 133 in time to a shape shown at 134 on line D, since the duration of signal 133 is normally much too short to operate relay circuits such as shown at 93, 110, 121, etc.

We claim as our invention:

1. In a magnetic testing device, a plurality of coils arranged to form an annular sensing head adapted to receive a test piece in its axial opening, said coils having split primary and split secondary windings, the split primary windings being connected in series and spaced from each other along the axis of the annular head, the split secondary windings being connected in series and disposed radially each around one of the primary windings, said primaries being connectable to the output of an oscillation source, said secondaries being connectable to the input of a signal indicating circuit, and adjustable reactance means coupling said primary and secondary windings outside of said annular head for neutralizing inductive reactance effects occurring between said windings within said head.

2. In a magnetic testing device, a plurality of coils arranged to form an annular sensing head adapted to receive a test piece in its axial opening, said coils having split primary and split secondary windings, the split primary windings being connected in series and spaced from each other along the axis of the annular head, the split secondary windings being connected in series and disposed radially each around one of the primary windings, said primaries being connectable to the output of an oscillation source, said secondaries being connectable to the input of a signal indicating circuit, adjustable reactance means coupling said primary and said secondary windings outside of said annular head for neutralizing inductive reactance effects occurring between said windings within said head, a housing surrounding said sensing head, and plate means forming a portion of said housing and being positioned between said split primary and secondary windings.

3. In a magnetic testing device, a plurality of coils arranged to form an annular sensing head adapted to receive a test piece in its axial opening, said coils having split primary and split secondary windings, the split primary windings being connected in series and spaced from each other along the axis of the annular head, the split secondary windings being connected in series and disposed radially each around one of the primary windings, said primaries being connectable to the output of an oscillation source, said secondaries being connectable to the input of a signal indicating circuit, and adjustable reactance means coupling said primary and said secondary windings outside of said annular head for neutralizing inductive reactance effects occurring between said windings within said head, a housing surrounding said sensing head formed of a steel alloy of high electrical permeability and having a U-shaped cross section, and annular plate means forming a portion of said housing and being positioned between said split primary and secondary windings.

4. A sensing head for a magnetic testing device comprising: two annular-shaped primary coils connected in series, said primary coils being axially spaced; an annular spacing member formed of magnetic material and disposed between said spaced primary coils; two annular-shaped secondary coils connected in series, said secondary coils being axially spaced and disposed to surround each of said primary coils; and an annular housing having a U-shaped cross section and formed of magnetic material, said housing being disposed to surround the sides and outer surface of said primary and secondary coils.

References Cited in the file of this patent

UNITED STATES PATENTS

| | | |
|---|---|---|
| 2,102,452 | Zuschlag | Dec. 14, 1937 |
| 2,104,645 | Greenslade | Jan. 4, 1938 |
| 2,437,455 | Berman | Mar. 9, 1948 |
| 2,443,661 | Lenehan | June 22, 1948 |
| 2,502,626 | Mages | Apr. 4, 1950 |
| 2,836,805 | Goldsmith | May 27, 1958 |

FOREIGN PATENTS

| | | |
|---|---|---|
| 881,262 | Germany | June 29, 1953 |